(12) United States Patent
Hurst

(10) Patent No.: US 8,230,871 B2
(45) Date of Patent: Jul. 31, 2012

(54) FLUID ACTIVATED FLOW CONTROL SYSTEM

(76) Inventor: James W. Hurst, Goleta, CA (US)

( * ) Notice: Subject to any disclaimer, the term of this patent is extended or adjusted under 35 U.S.C. 154(b) by 803 days.

(21) Appl. No.: 12/028,992

(22) Filed: Feb. 11, 2008

(65) Prior Publication Data

US 2008/0190488 A1 Aug. 14, 2008

Related U.S. Application Data

(60) Provisional application No. 60/901,055, filed on Feb. 12, 2007.

(51) Int. Cl.
*G05D 7/01* (2006.01)
(52) U.S. Cl. ............... 137/119.03; 137/119.08; 251/230
(58) Field of Classification Search ............ 137/119.03, 137/119.08; 251/230
See application file for complete search history.

(56) References Cited

U.S. PATENT DOCUMENTS

| | | | |
|---|---|---|---|
| 961,271 A | 1/1911 | Hutchins | |
| 1,590,558 A | 6/1926 | Stenhouse | |
| 1,606,245 A | 11/1926 | Lang | |
| 1,704,374 A | 3/1929 | Stewart et al. | |
| 2,059,126 A | 10/1936 | Malthaner | |
| 2,311,108 A | 2/1943 | Hauser | |
| 2,341,041 A | 2/1944 | Hauser | |
| 2,591,216 A | 4/1952 | Thompson et al. | |
| 2,619,105 A | 11/1952 | Hauser | |
| 2,625,429 A | 1/1953 | Coles | |
| 2,641,280 A * | 6/1953 | Fleischhauer | 137/625 |
| 2,642,076 A | 6/1953 | Tigert et al. | |
| 2,744,541 A | 5/1956 | Fleischhauer | |
| 2,880,757 A | 4/1959 | Campbell | |
| 2,921,629 A | 1/1960 | Stout | |
| 3,003,514 A | 10/1961 | Furlong | |
| 3,105,518 A | 10/1963 | Kunz | |
| 3,108,609 A | 10/1963 | Schroder | |
| 3,181,551 A | 5/1965 | Coletti | |
| 3,224,458 A | 12/1965 | Davis | |
| 3,256,909 A | 6/1966 | Obidniak et al. | |
| 3,335,756 A | 8/1967 | McPherson | |
| 3,344,809 A * | 10/1967 | Smith | 137/624.18 |
| 3,369,565 A | 2/1968 | Haggard, Jr. | |
| 3,402,890 A | 9/1968 | Heitzman | |
| 3,405,733 A | 10/1968 | Hansen | |
| 3,422,847 A | 1/1969 | Polizzi | |
| 3,431,933 A | 3/1969 | Tidd | |
| 3,454,048 A | 7/1969 | Van Der Veer | |
| 3,478,780 A | 11/1969 | Gheen | |
| 3,480,034 A | 11/1969 | Jerome | |
| 3,512,543 A | 5/1970 | Kubik | |

(Continued)

OTHER PUBLICATIONS

4000 Series Indexing Valves from www.krain.com/index.cfm?fuseaction=indexingVlvs.4000series, no date.

*Primary Examiner* — William McCalister
(74) *Attorney, Agent, or Firm* — Patent Procurement Services

(57) ABSTRACT

A fluid flow regulating device is provided that maintains pressure and flow rate characteristics of a source fluid while the fluid is distributed to multiple delivery lines. The inventive device switches between multiple output ports in response to fluid pressure changes or by a mechanism driven by fluid flow. Thus, existing fluid delivery systems are easily expandable while avoiding installation of additional timing control mechanisms, electrical runs, or fluid sources.

6 Claims, 11 Drawing Sheets

U.S. PATENT DOCUMENTS

| | | |
|---|---|---|
| 3,524,470 A | 8/1970 | Kah, Jr. et al. |
| 3,604,456 A | 9/1971 | Jones |
| 3,747,620 A | 7/1973 | Kah, Jr. |
| 3,845,777 A * | 11/1974 | Gilson .................. 137/119.03 |
| 4,029,119 A | 6/1977 | Klieves |
| 4,077,424 A | 3/1978 | Ehret et al. |
| 4,150,685 A | 4/1979 | Van Haaften |
| 4,178,954 A | 12/1979 | Klieves |
| 4,235,254 A | 11/1980 | Kirby |
| 4,313,455 A | 2/1982 | Pitman |
| 4,323,194 A | 4/1982 | Newbold et al. |
| 4,502,506 A * | 3/1985 | Fisher .................. 137/624.12 |
| 4,523,606 A | 6/1985 | Gould et al. |
| 4,585,027 A | 4/1986 | Stillions |
| 4,592,379 A | 6/1986 | Goettl |
| 4,611,617 A | 9/1986 | Hewitt |
| 4,708,264 A | 11/1987 | Bruninga |
| 4,744,285 A | 5/1988 | Presley |
| 4,817,661 A * | 4/1989 | Howeth .................. 137/119.03 |
| 4,838,485 A | 6/1989 | Rinkewich |
| 4,961,538 A | 10/1990 | Hewitt |
| 5,082,022 A | 1/1992 | Boundy |
| 5,100,056 A | 3/1992 | Theodorsen et al. |
| 5,207,354 A | 5/1993 | Hsu et al. |
| 5,806,556 A | 9/1998 | Johnson |
| 6,102,362 A | 8/2000 | Gerber |
| 6,126,141 A | 10/2000 | Geiger |
| 6,311,728 B1 | 11/2001 | Goettl |
| 6,314,999 B1 | 11/2001 | Conn |
| 6,325,087 B1 | 12/2001 | Tarr |
| 6,360,767 B1 | 3/2002 | Barnes |
| 6,386,232 B2 | 5/2002 | Serrano Sanchez et al. |
| 6,539,967 B2 | 4/2003 | Tarr |

* cited by examiner

FLUID ACTIVATED FLOW CONTROL SYSTEM

CROSS-REFERENCE TO RELATED APPLICATIONS

This application claims the benefit of U.S. Provisional Application No. 60/901,055 filed Feb. 12, 2007, which is incorporated herein by reference.

FIELD OF THE INVENTION

This invention relates generally to devices for regulating fluid flow. More specifically, the instant invention relates to a system for regulating fluid flow between one or more lines. More specifically, the instant invention relates to a pressure or automatic fluid activated flow control system suitable for regulating fluid flow between one or more fluid delivery lines suitable for use in irrigation.

BACKGROUND OF TEE INVENTION

Agricultural, commercial, and domestic irrigation systems are commonly constructed of fixed piping that depend on a single source for delivery of water to the entire system. The flow in a given pipeline is limited by its length, diameter, internal surface condition, and fluid pressure. Thus, for any single fluid source the flow in a pipeline is not expandable beyond a given length or number of fluid delivery terminals such as a sprinkler head. Thus, expansion of fluid delivery coverage is difficult, costly, and commonly involves addition of additional source controls and pipe.

Adding new pipe runs has the added difficulty of requiring costly trenching and cutting or circumventing pavement such as sidewalls, roads, driveways, and patios. More importantly, should all the control circuits be utilized in the existing system, expansion will require addition of a new or additional timing mechanism further increasing the cost, maintenance, and difficulty of operating the system.

Further, installation of long piping runs with more than one flow control valve involves installation of long electrical runs to service solenoids that may be distant from the electrical source. This adds significantly to the cost of expanding an existing irrigation system and results in increased maintenance needs.

Current irrigation systems switch between multiple irrigation runs by using an electronic clock system that signals solenoids placed on remote valves to activate or shut off water flow through each respective valve. This system organization requires installation of electrical cables from the clock system to each solenoid valve. Thus, both flow control and a timer control mechanisms are required to distribute a single source of water through a system of lines. This multiple control system is costly to purchase and install. Further, expansion of the existing system requires additional trenching to install new electric lines to regulate new valve systems.

Prior art solutions to the above problems employed various schemes that used an impeller driven rotating plate with an orifice or cam that sequentially opened radially positioned ports. Such a device is illustrated in U.S. Pat. No. 6,539,967, which is incorporated herein by reference. These devices suffer from numerous drawbacks including water hammering due to slow activation or deactivation of the output valves and difficult or absent timing adjustment. Devices that provided timing adjustment required a difficult and awkward process of changing the cams within the mechanism, thus requiring shutting down the system and professional adjustment.

Installation of prior art water distribution systems requires replacing or removing existing valve systems and replacing them with a complicated control device. The complexity of the prior art control devices requires precise manufacturing standards to ensure functionality and results in increased cost of purchase, operation, and maintenance, thus, increasing warranty replacement costs and detrimentally affecting customer goodwill.

Thus, there exists a need for a fluid control device capable of expanding fluid delivery area in an existing system, utilizing an existing timing control or requiring no timing control, and is suitable for installation at a location distant from an electrical source.

SUMMARY OF THE INVENTION

A fluid flow control device is provided whereby a servo assembly is controlled by a pressure activated mechanism or a fluid flow mechanism. A device includes a pressure activated servo assembly with a diaphragm connected to a drive post. The drive post is positioned so that movement of the diaphragm translates to rotational motion of a cog wheel. The cog wheel is connected to a servo valve that has at least one valve shaft port that is capable of transmitting fluid between a plurality of tubes that are connected to the servo valve. The tubes are also connected to at least one output valve. Two output valves are controlled by one pressure activated mechanism.

The device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is spaced in alignment with the exit port.

The drive post has both a post and a cog drive spring where the spring physically interacts with the cog wheel. An anti-back rotation leaf spring stop is also in physical interaction with the cog wheel so that rotation of the cog wheel rotates unidirectionally. A flow control arm connected to the diaphragm is also provided.

An automatically controlled flow control device is provided whereby control of the servo valve is by the system having a fluid inlet port and at least one output port. A turbine is in fluid communication with the fluid inlet port and is connected to a turbine shaft drive which interacts with a speed reducing mechanism such that rotation of at least a portion of the turbine drives the speed reducing mechanism. A timing control assembly is connected to the speed reducing mechanism and transiently connected to a servo valve shaft in a servo valve. The servo valve shaft has at least one valve shaft port that provides fluid connection between a plurality of tubes. The servo valve shaft rotates in response to rotation of the turbine and the speed reducing mechanism. The tubes are also connected to at least one output valve. The instant invention provides for two output valves.

A servo activation lever is also provided connected to the valve shaft. At least one spring arm connected to the speed reducing mechanism transiently associates with the servo activation lever. The servo activation lever is provided with at least one lever rotation stop that is capable of limiting the rotation of the servo activation lever. A detent bar is provided in transient association with the spring arm so that rotation of at least a portion of the spring arm is retarded when in contact with the detent bar.

A timing control knob is also provided. The timing control knob has a color code to indicate the relative time of operation of at least one output valve. At least one color code button is also present on at least one output valve.

The device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is paced in alignment with the exit port.

The output valve is provided with a flow control arm. The output valve is aligned with the servo valve.

DETAILED DESCRIPTION OF THE PREFERRED EMBODIMENTS

Figure 1:
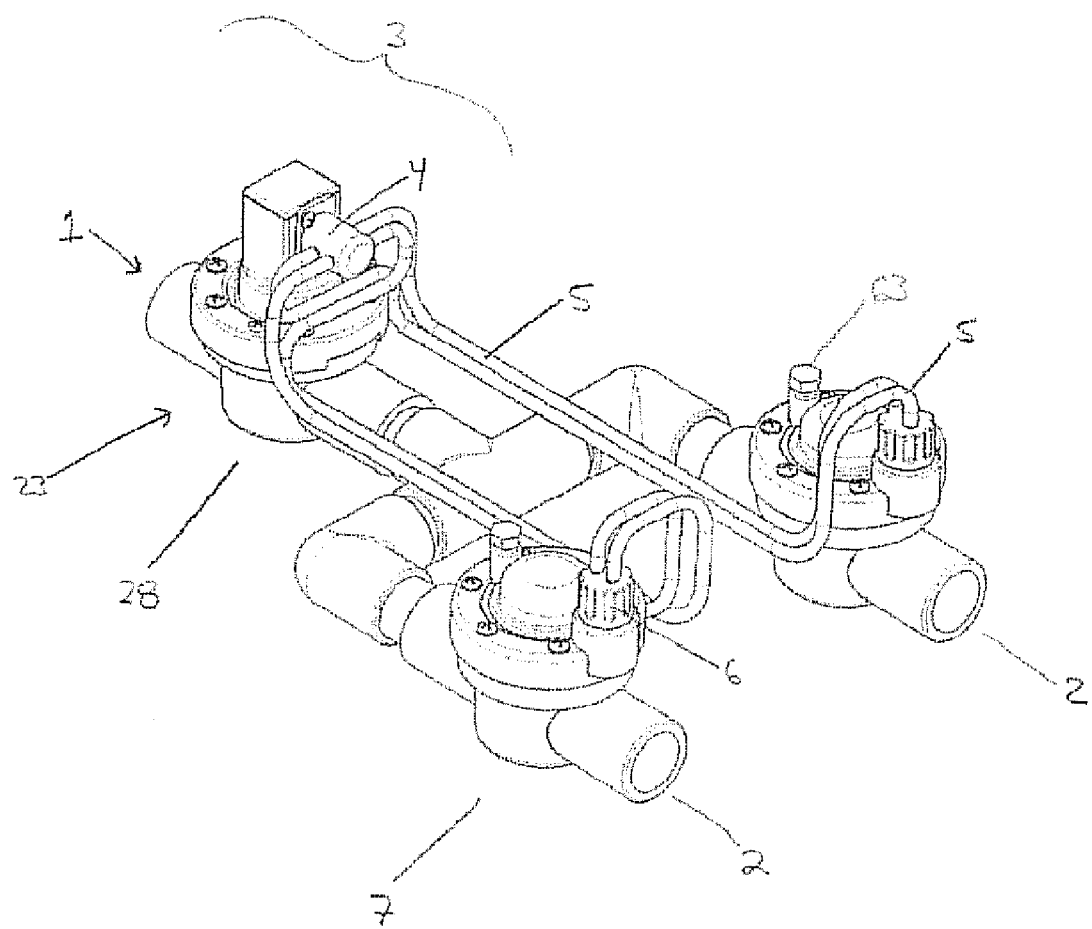
FIG. 1 depicts a general arrangement of an inventive flow control device controlled by a pressure activated servo assembly.

The instant invention is capable of expanding an existing irrigation or other fluid delivery system without the need for electric regulation of flow distribution. Moreover the instant invention is capable of regulating fluid distribution by an existing pressure control mechanism or independent of a pressure control mechanism. The instant invention has utility for regulating fluid flow and distribution in irrigation or other fluid delivery systems.

As used herein the term fluid means any liquid capable of distribution. Illustratively, fluid is water, milk, juice, aqueous buffer, solvent, organic or inorganic liquids, gas, air, fluidized solid, slurry, liquid that contains particulate matter, solvated chemicals, or other molecule or material that requires distribution. In a preferred embodiment fluid is water. However, it is appreciated that the flow control system is independent of the fluid that is delivered, and a person having ordinary skill in the art recognizes that enablement for one liquid enables one to make and use the invention with any fluid.

An aspect of the instant invention is that it is suitable for use with any valve. Valve types operative herein illustratively include in-line, diaphragm, bypass, rotary in-line, slide, spool, restrictor, servo, exhaust, check, anti-siphon, ball, bib-cock, stopcock, demand, double check, duckbill, flow control, foot, gas pressure regulator, leaf, pilot, poppet, sleeve, pressure reducing, pressure sustaining, back flow reducing, reed, saddle, solenoid, vacuum breaker, combinations thereof, or other valve configurations known in the art.

It is appreciated that a valve operable herein optionally includes a flow control arm 63 that prevents complete opening of the valve. Illustratively, a flow control arm 63 limits the movement of the diaphragm such that the valve prevents the full magnitude of source flow from reaching the output port. A flow control arm 63 is optionally adjustable. Adjustability is optionally by a screw control or other adjustment or micro adjustment mechanism. known in the art.

U.S. Provisional Application No. 60/901,055 is incorporated herein by reference as if each line and figure were explicitly set out herein. With particularity, FIGS. 1-82, which depict preferred embodiments of the instant invention and the accompanying description of each figure are incorporated herein by reference.

The inventive flow control device components are optionally formed of a thermoplastic material and preferably are injection molded. Materials illustratively operative herein are thermoformable plastic, polyurethane, polypropylene, polyethylene, polyester, vinyl, polystyrene, rubber, die-cast metal, aluminum, steel, other suitable metals, reinforced plastic, inter fiber reinforced composite, combinations thereof, or other materials known in the art. Thermoplastic materials operative herein illustratively include but are not limited to, polystyrene, acrylonitrile, butyl styrene, and polyalkylenes.

Figure numbering is conserved between all figures. Thus, a numbered element holds the same number independent of the figure referred to.

FIG. 1 represents a generalized arrangement for the inventive flow control device whereby a fluid inlet port 1 receives fluid from a source and the inventive device automatically determines whether one or more distribution valves 7 are activated or inactivated, thus, directing fluid out one or more of a group of fluid outlet ports 2 to a fluid distribution line.

In a preferred embodiment a fluid activated servo assembly 3 receives fluid from a source via an inlet port 1. Pressure, flow rate, or other parameter of the input fluid drives the fluid activated servo assembly 3 to activate or deactivate one or more output valves 7. When more than one output valve 7 is present, activation of one output valve 7 occurs simultaneously, nor newly thereto, with deactivation of another output valve 7. Thus, fluid is directed into a particular distribution line with the same pressure and flow characteristics of the source fluid. By control from the fluid activated servo assembly 3, fluid is optionally then directed to a different distribution line by deactivation of the first output valve 7 and activation of another output valve 7. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In a preferred embodiment a single fluid activated servo assembly regulates flow through two output valves. However, it is appreciated that the servo assembly is suitable for regulation of one, two, three, four, five, six, or more output valves. This is optionally accomplished by adding multiple valve shaft ports (FIG. 3, 21) at various angles each allowing fluid flow to one output valve. While the instant invention is described with respect to two output valves, a person having ordinary skill in the art recognizes description and enablement of any number of output valves without limitation.

FIG. 1 also depicts a general communication system between the servo assembly 3 and the output valves 7. The servo assembly 3 optionally uses a servo valve 4 to allow fluid flow from one or more output valves 7 via two tubes 5. The tubes 5 communicate fluid to an output valve by an adapter 6 that optionally replaces the solenoid in a standard prior art solenoid controlled diaphragm valve. Thus, the instant invention optionally incorporates the low cost and simplicity of widely used diaphragm valves with the newly invented fluid activated servo devices.

Figure 2:
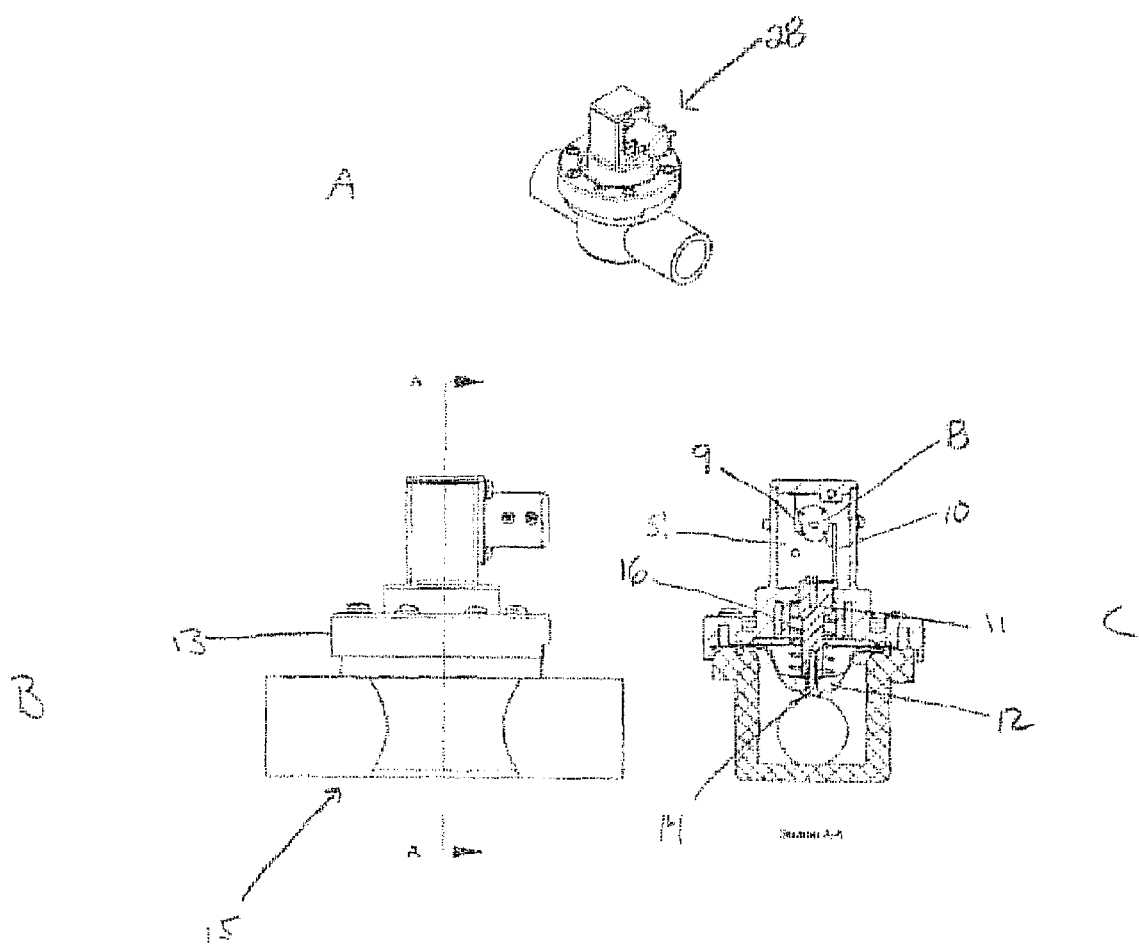
FIG. 2 depicts an arrangement of a pressure activated servo assembly.
Figure 3:
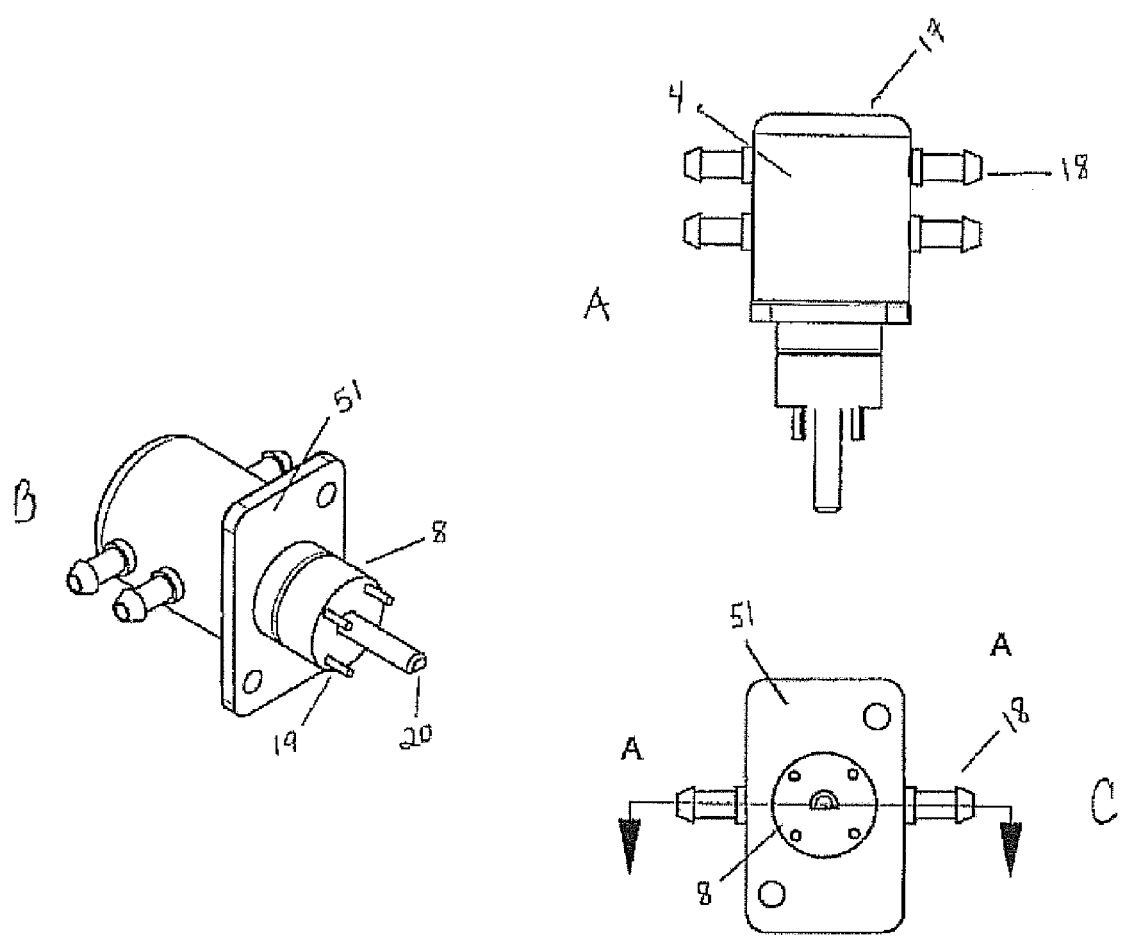
FIG. 3 depicts a servo valve as associated with a pressure activated servo assembly.
Figure 3:
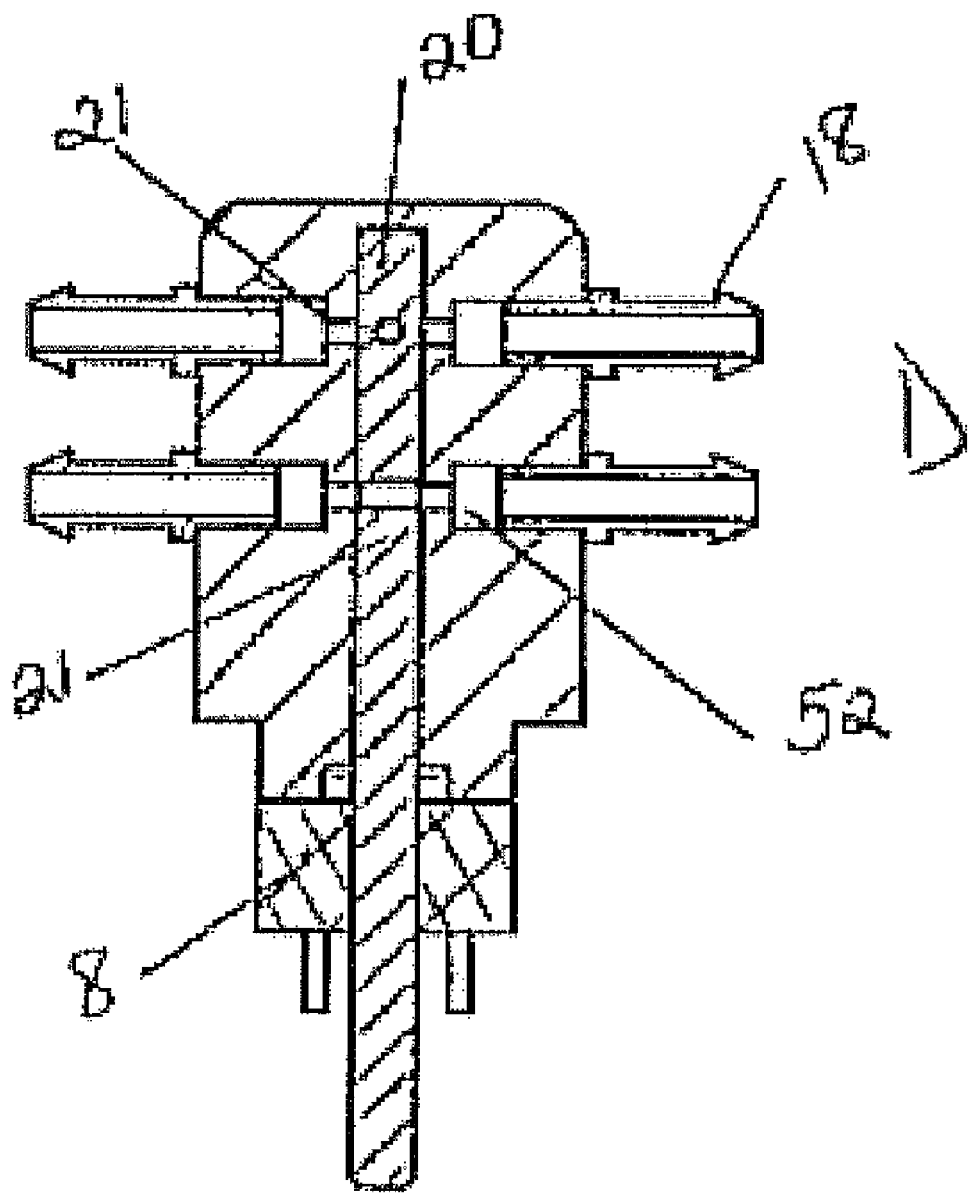

In a preferred embodiment as depicted in FIGS. 1-3 a fluid activated servo assembly 3 is a pressure activated servo assembly 28. The pressure activated servo assembly (PA) uses a pressure actuated mechanism to rotate a servo valve shaft 20 that switches the output valves 7. The PA optionally alternatively distributes fluid from the original pipe into output ports 2 on a timed basis so that each output port 2 can deliver the same volume of fluid at the same pressure as is present at the inlet port 1. Thus, in an exemplary irrigation system the watering area can by doubled using one inventive fluid control device. Further, greater area can be covered by employing multiple inventive fluid control devices in a cascading fashion. In the case of a pressure activated servo assembly 3, an existing system need only be modified by application of a single extra timer station. No new supply pipes, long trenches, or remote wiring is needed.

An exemplary PA 28 is optionally constructed of an actuator housing 15 that is coupled with a cap 13 in such a way to form a seal sufficient to prevent fluid leakage. An existing prior art in-line diaphragm valve is optionally modified for use in the instant invention whereby the actuator housing 15 is modified by insertion of a plug into the servo release port. It is appreciated that any method of stopping fluid entry into the servo release port is similarly suitable, or production of an actuator housing 15 without a servo release port is similarly operable. The cap 15 houses the servo actuated assembly that has a diaphragm 12 at the lower end of the system controlled by a spring 16 or series of springs that provide suitable force to extend the diaphragm 12 into the actuator housing 15 when pressure is reduced from the fluid source. Optionally, a single or dual acting piston drive is operable in place of the diaphragm and spring system. The cap 13 is mounted to a servo support block 51 that optionally supports an optional additional spring to increase the return force for activation of the cog mechanism. The cap 13 has a center hole that accepts a drive post 11 such that extension or retraction of the diaphragm 12 raises or lowers the drive post 11 relative to the cap 13. The drive post 11 is optionally mounted to the diaphragm 12 by a drive post mounting screw 14 or other attachment mechanism known in the art. At the opposite end of the drive post 11 is attached a cog drive spring 10 that interfaces with a cog wheel 8 to produce rotational force in the cog wheel 8 when the drive post is raised in response to reapplication of fluid pressure and raising of the diaphragm 12.

It is appreciated that any diaphragm, piston drive, or other means of stopping fluid flow is operable herein. Non-limiting examples include a dual bladder, single bladder with spring return, double acting diaphragms, single diaphragms with spring or other return, a dual acting piston drive, a single acting piston drive with spring or other return, combinations thereof, or other means known in the art.

An exemplary cog wheel has four cog wheel posts 19 positioned at each 90 degree region of the cog wheel 8. Thus, the raising of the drive post 11 rotates the cog wheel 90 degrees. The cog drive spring 10 optionally has a flange that provides a shelf that engages a cog wheel post 19 to drive the cog wheel 8 in the forward direction. The cog drive spring 10 is optionally flexible such that when the drive post 11 is moved downward a lower cog wheel post 19 does not impede the downward movement of the drive post and positions the next cog wheel post 19 such that a subsequent raising of the drive post 11 will result in forward rotation of the cog wheel.

It is appreciated that the more cog wheel posts are operable on the cog wheel. The number of cog wheel posts is related to the number of valve shaft ports and output valves in the device. In a non-limiting example, a cog wheel has six (6) cog wheel posts. Thus, each phase of rotation rotates the valve shaft 60 degrees allowing control of three output valves. Other configurations are similarly operable.

The system optionally includes an anti-back rotation leaf spring stop 9 that prevents the cog wheel 8 from reversing rotational direction. The anti-back rotation leaf spring optionally has a flange that provides a shelf that engages a cog wheel post preventing back rotation. The anti-back rotation leaf spring 9 is flexible such that it does not impede the forward rotation of the cog wheel 8.

The cog wheel 8 optionally has a rotational resistance sufficient to prevent reverse movement of the wheel when the drive post 11 is lowered. This rotational resistance is optionally provided by an O-ring or other pressure seal that provides suitable friction to prevent unwanted reverse movement of the cog wheel 8 while not being so great as to impede forward rotation when the drive post 11 is raised.

FIG. 3 depicts a preferred embodiment of a servo valve assembly 4. A valve shaft 20 is rotatable with respect to the servo body 17 and a shaft that connects two or more tubing interconnect fittings 18. The valve shaft 20 is secured to the cog wheel 8 such that rotation of the cog wheel 8 produces rotation in the valve shaft 20. The valve shaft 20 is optionally cylindrical in shape. Preferably the valve shaft 20 is hemispherically shaped where it meets the cog wheel 8 such that the rotational force in the cog wheel is efficiently translated to the valve shaft 20. It is recognized in the art that other shapes for the cog wheel interface end of the valve shaft 20 are similarly suitable illustratively including square, triangle, oval, rectangle, pentagon, hexagon, and other shapes known in the art. Alternatively or additionally, the valve shaft 20 meets the cog wheel 8 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 8 and valve shaft 20 are optionally formed from a single unitary piece eliminating the need for fitting a separate valve shaft 20 and cog wheel 8.

The servo valve assembly 4 preferably includes a servo body 17 that has at least one servo body shaft 52 interconnecting two tubing interconnect fittings 18. Preferably, a servo body 17 has two servo body shafts 52. However, it is appreciated that multiple other servo body shafts are similarly operable. For example, three, four, five, or six servo body shafts are operable, each serving a single output valve. The servo body 17 preferably has a cavity to accept a valve shaft 20 such that when a valve shaft port 20 aligns with servo body shaft 52 fluid flow is possible. In an optional embodiment, a valve shaft port is a slot (FIG. 8, 21) that allows communication between two adjacently positioned tubing interconnect fittings 18. It is appreciated that any method of regulating flow between two or more shafts is similarly operable herein. When two valve shaft ports 21 are present in a valve shaft 20 they are preferably positioned at 90 degrees relative to one another. Thus, a 90 degree rotation of the cog wheel aligns one valve shaft port 21 with a corresponding servo body shaft 52. The valve shaft ports 21 are preferably capable of delivering flow omnidirectionally. Thus, only one set of servo body shafts 52 are aligned at one time regulating flow to one output valve 7. This arrangement provided alternating flow through the servo body 17 for each 90 degrees of valve shaft 20 rotation as provided by four cog wheel posts 19 on the cog wheel 8.

It is appreciated that multiple configurations of a valve shaft port 21 are operable herein. In a preferred embodiment a valve shaft port is a straight shaft passing from one side of the valve shaft 20 to the other through a central axis. Alternatively, a valve shaft port is a notch with a length parallel to the central axis of the valve shaft. The notch forms a flow bypass zone that allows flow between two servo body shafts adjacent to each other A valve shaft port 21 operable herein is illustratively non-linear and is optionally designed to allow fluid flow between servo body shafts 52 in any orientation. It is appreciated that a valve shaft port optionally incorporates a back flow prevention system such that fluid flow through a valve shaft port is unidirectional.

The inventive servo valve assembly 4 optionally is housed in a protective cover to reduce contamination by soil, water, or other environmental conditions. A protective cover is optionally a separate piece that is removable, or is incorporated into a single injection molded part that may be unitary or separate from the cap 13.

The inventive arrangement functions when the source fluid is pressurized by forcing the drive post 11 into its raised position extending the cog drive spring 10 to rotate the cog wheel 8 into its new position. This position aligns one of the valve shaft ports in the valve shaft 20 with its respective shaft connected to tubing interconnect fittings 18 in the servo valve. This position allows fluid to flow from an output valve 7 causing the output valve to open. Upon termination of the fluid pressure cycle by the control mechanism, the pressure is removed from the diaphragm 12 allowing pressure from the springs 16 to extend the diaphragm into the closed position while the leaf spring 9 prevents the cog wheel 8 from rotating in the reverse direction by the retraction of the drive spring 10.

In a preferred embodiment, two commercially available output diaphragm valves are connected to the fluid activated servo assembly 3 using standard PVC plumbing fittings. When fluid pressure is applied (turned on at the central control source) it enters the assembly at a fluid inlet port 1 and pressurizes a diaphragm 12 inside the servo assembly 3 that moves a drive post 11 bar and cog wheel 8 that rotates a servo valve 20 which in turn controls the output diaphragm valves 7. When fluid pressure is turned off the drive post 11 returns to its starting position. When pressure is reapplied the drive post engages a new cog wheel post 19 that rotates the servo valve 20 to a new position thereby opening the opposite output diaphragm valve 7. This alternates as determined by the fluid source control timer. Time durations can be set for each output port per normal timer operation.

Each of the valves is optionally formed from a commercially existing fluid valve. Fluid valves, pipes, fittings, and other parts of commercially available fluid control systems operative as base units herein are optionally obtained from irrigation supply sources or splinklerwarehouse.com.

A user may have an existing system in which all the timing or control stations are in prior use and no expansion of the existing control mechanism is possible. Alternatively, in a new or existing installation a control mechanism is not present or may be a simple manually operated tap. In these situations, or otherwise if desired, the inventive flow control device is configured with a fluid flow regulated flow control device.

Figure 4:
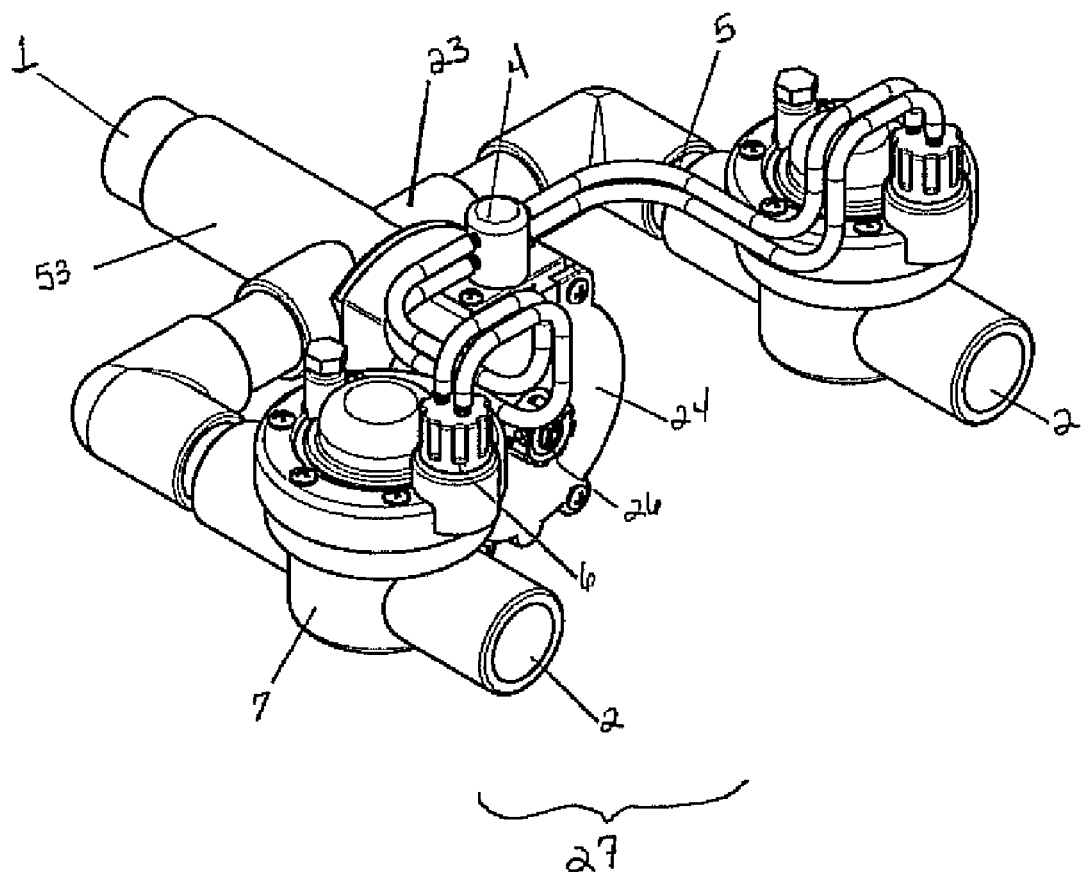
FIG. 4 depicts a general arrangement of an inventive flow control device controlled by a self-activating valve assembly.

As depicted in FIG. 4, a fluid flow regulated flow control device is generally a self-activating valve assembly 27 configured with an impeller assembly 25 housed downstream of the inlet port 1, a control assembly 23 including a gear box 24, a servo valve assembly 4, and a timing control assembly adjusted by a mechanism—illustratively a knob 26. The self-activating valve assembly 27 controls flow, via a plurality of tubes 5, between one or more adapters 6 that direct flow between the self-activating valve assembly and one or more output valves 7 that are activated or deactivated to regulate flow out a fluid output port 2. Preferably, a control assembly 23 regulates flow between two output valves 7 arranged on either side of the control assembly. It is appreciated that other configurations and number of output valves are operable in the instant inventive device. For example, the control assembly is optionally in a linear alignment with the output valves. Such a configuration optionally provides a device with no tubing and with flow regulated directly between an output valve and the control assembly by a channel or shaft. Other configurations are similarly operable to eliminate the need for tubing.

Figure 5:
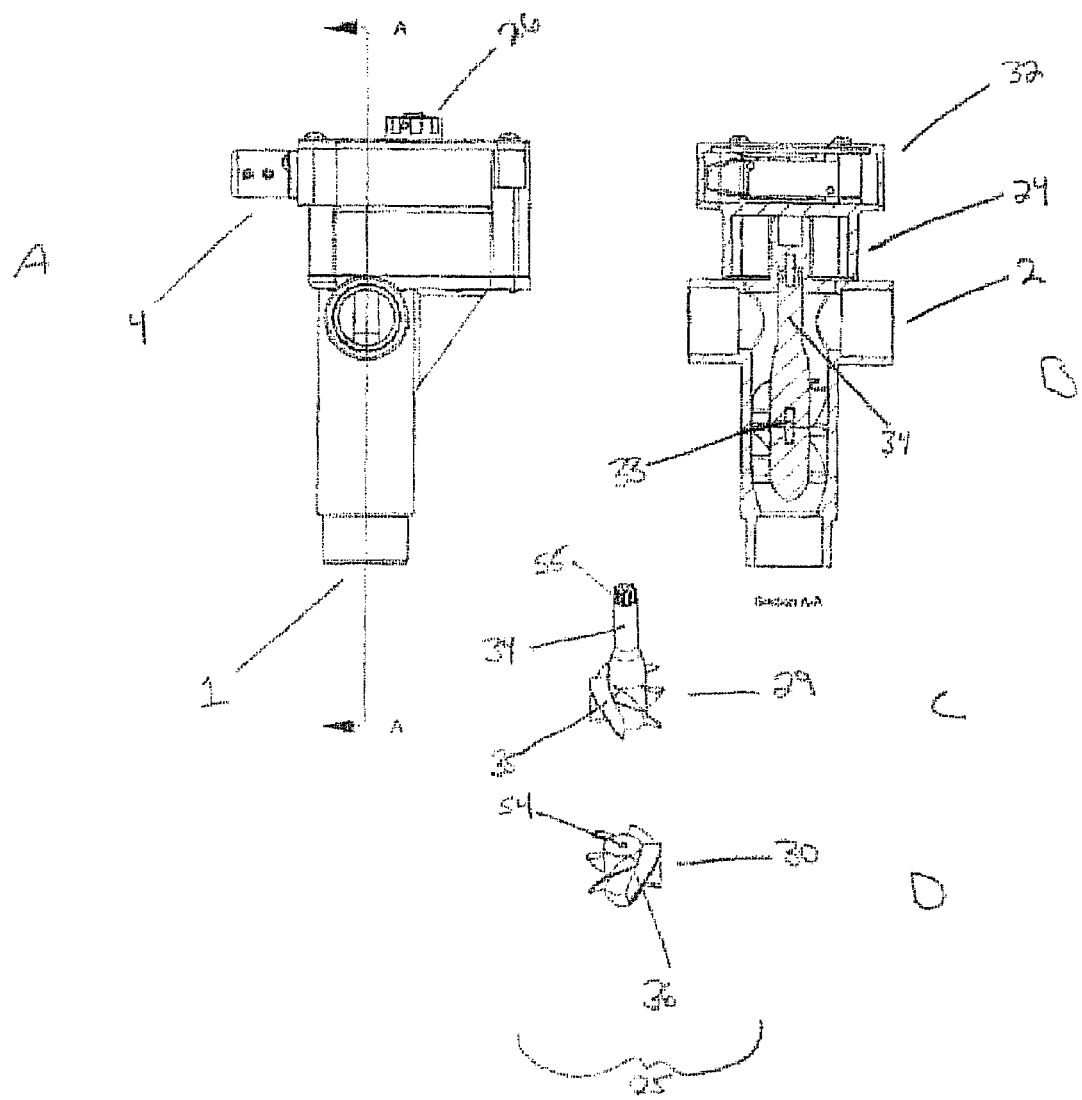
FIG. 5 depicts a self-activating valve assembly.

FIG. 5 depicts a control assembly. Downstream of an inlet port is a turbine that optionally is comprised of an impeller assembly. An impeller assembly is optionally an assembly of an impeller 29 and a stator 30. A stator 30 has a series of stator blades 36 surrounding the central shaft. The stator blades are optionally curved to direct flow in a circular fashion around the stator from the front end of the stator toward the back end. The front end of a stator is the portion facing the direction of fluid flow. The stator front end is optionally streamlined to increase efficiency of fluid flow across and beyond the stator. The stator blades 36 are dimensioned such that the stator will optionally press fit into a housing 53 surrounding the turbine. The number of stator blades is appreciated to be any number to induce a rotational flow in the fluid. The number of stator blades is illustratively 1, 2, 3, 4, 5, 6, 7, 8, 9, 10, or a greater number. A retainer cap optionally is connected to the inlet port to maintain the turbine 25 in the housing 53. It is appreciated that other methods of retaining the stator 30 stationary in a housing 53 are similarly operable illustratively including use of an adhesive.

A stator optionally has a bushing 54 in its central axis that receives a support shaft 33. The support shaft is connected to the central axis of an impeller 29 such that the impeller is rotatable about the central axis. An inventive impeller 29 optionally has a plurality of impeller blades 35 from as few as one to as many as is suitable for producing rotary force in the impeller. The number of impeller blades is illustratively 1, 2, 3, 4, 5, 6, 7, 8, 9, 10, or a greater number. The impeller blades 35 are preferably curved so that axial flow creates torsion or rotary force to produce rotational velocity and torque sufficient to power the inventive device. It is appreciated that an impeller is of any design known in the art suitable for producing rotary force around an axis when fluid flows across the impeller. Optionally the impeller blades are straight. Preferably, impeller blades are angled relative to a central axis of the impeller so that fluid flow from the stator forces against the side of an impeller blade inducing rotary motion in the impeller. It is further appreciated that other devices capable of being rotationally driven by fluid flow are similarly operable illustratively including a paddle wheel, fan blade arrangement, screw mechanism, or other configurations known in the art.

An impeller preferably has a streamlined exit shape. A support shaft 33 maintains a central axis around which the impeller will rotate. The impeller preferably has a diameter smaller than the inner diameter of the housing. Any clearance sufficient to produce a freely rotating impeller within the housing is operable. Preferably the clearance is between 0.001 and 0.05 inches. More preferably the clearance is between 0.002 and 0.04 inches. Most preferably the clearance is between 0.005 and 0.01 inches. An inventive housing 53 optionally has a larger inner diameter than the inlet port 1 such that the fluid flow is maintained independent of axial flow around the turbine. As such, turbine pressure losses are kept negligible by maintaining a flow cross section area that is larger than that of the input and output lines and by providing smooth streamlined changes in internal passage shapes.

A turbine output shaft 34 extends axially from the exit of the impeller 29. The turbine output shaft 34 translates the rotary force produced by the impeller into a gear box 24. A main pinion gear 55 is present on the turbine output shaft 34. The main pinion gear is optionally integral with the impeller output shaft, or is affixed. Preferably the turbine output shaft 34 is hemispherically shaped where it meets the main pinion gear 55 such that the rotational force in the turbine output shaft is efficiently translated to the main pinion gear 55. It is recognized in the art that other shapes for the main pinion gear interface end of the turbine output shaft 34 are similarly suitable illustratively including square, triangle, oval, rectangle, pentagon, hexagon, and other shapes known in the art. Optionally, the turbine output shaft 34 meets the main pinion gear 55 in a pressure fitting such that the association of the two parts provides sufficient frictional force that rotation of the turbine output shaft 34 translates to rotation of the main pinion gear 55.

Figure 6:
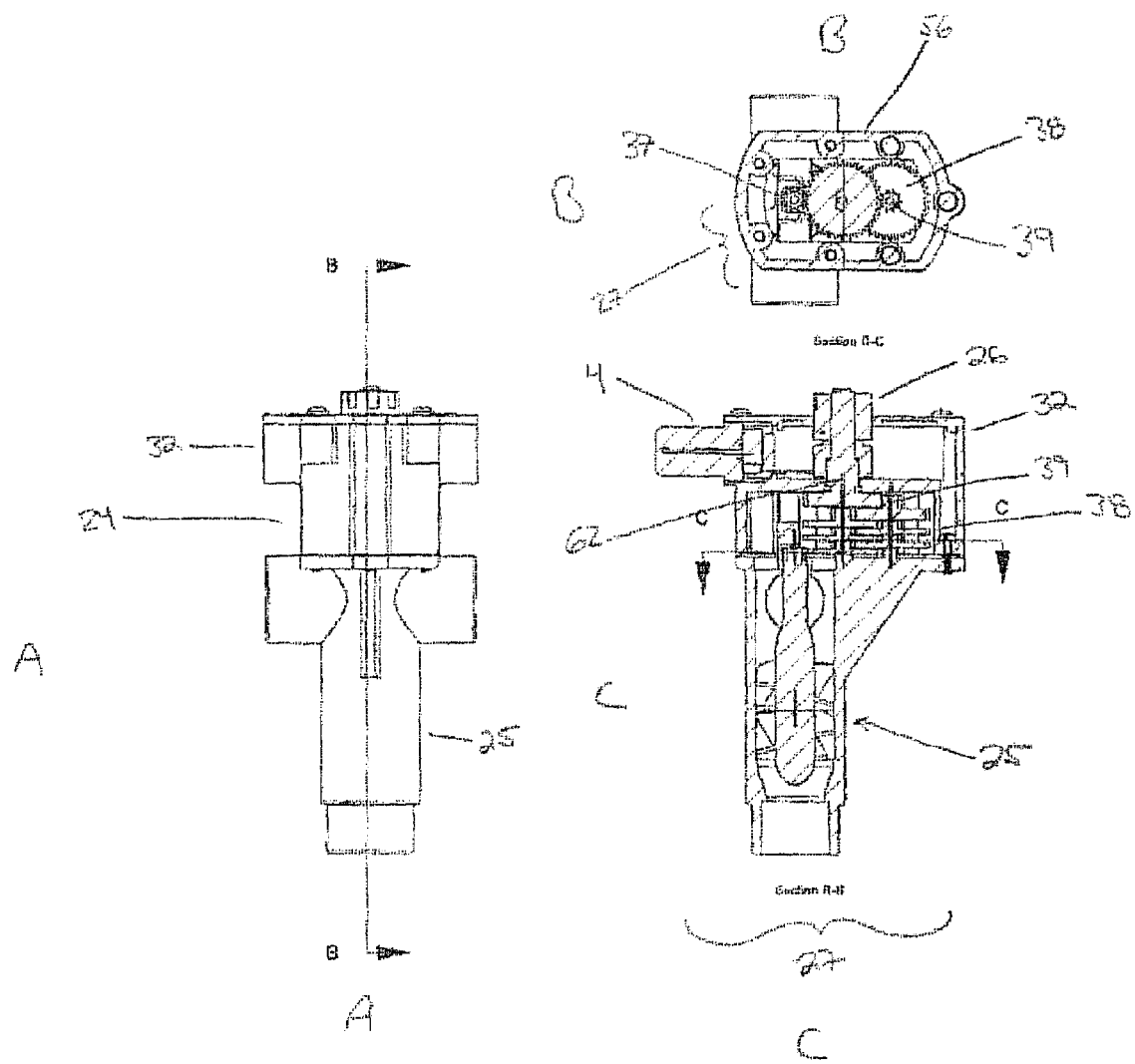
FIG. 6 provides additional detail of a self-activating valve assembly.

Rotation of the impeller 29 thereby rotationally drives the main pinion gear 55. The main pinion gear preferably associates with a family of cluster gears that form a speed reducing mechanism within the gearbox 24. FIG. 6C illustrates a cross section of a self-activating valve assembly 27. The gearbox as depicted in FIGS. 6B and C preferably is a gearbox housing 56 surrounding a speed reducing mechanism 38. In a preferred embodiment the speed reducing mechanism is a family of cluster gears. The cluster gears rotate about a plurality of cluster gear spindles 39. Optionally, two cluster gear spindles are present. In a preferred embodiment one spindle serves as a central axis for gears and the other both as a central axis for gears and as a central axis for the timing control assembly 32. The cluster gears culminate in rotation in an output gear affixed or integral with a spindle shaft. The spindle shaft on which the output gear is affixed optionally is fitted with a square shank. Preferably, an independent output shaft 62 is present and is driven by the cluster gears. In this embodiment the output shaft 62 is fitted with a square shank to interact with the timing control assembly 32. It is appreciated that other shapes for the shank are operative herein illustratively including triangle, oval, rectangle, pentagon, hexagon, and other shapes known in the art. Other means of affixing or driving rotation in an output gear are known in the art and are similarly operable herein.

The gearbox 24 also has a cover plate that when applied to the housing 56 is sealed so that fluid cannot escape the gear box. In this embodiment a spindle shaft traverses the cover plate and is sealed with an O-ring. The shank is affixed to the spindle shaft 39 at the outside of the cover plate. It is appreciated that the gearbox is optionally totally sealed from fluid by means of an O-ring surrounding the impeller output shaft 34 and a second seal surrounding the output gear spindle shaft. Thus, necessary lubricants in the gearbox are not transmitted to the fluid. It is appreciated that the gearbox is operable in fluid, Thus, there is optionally no seal around the impeller output shaft 34 such that the gearbox is accessible by fluid.

Figure 7:
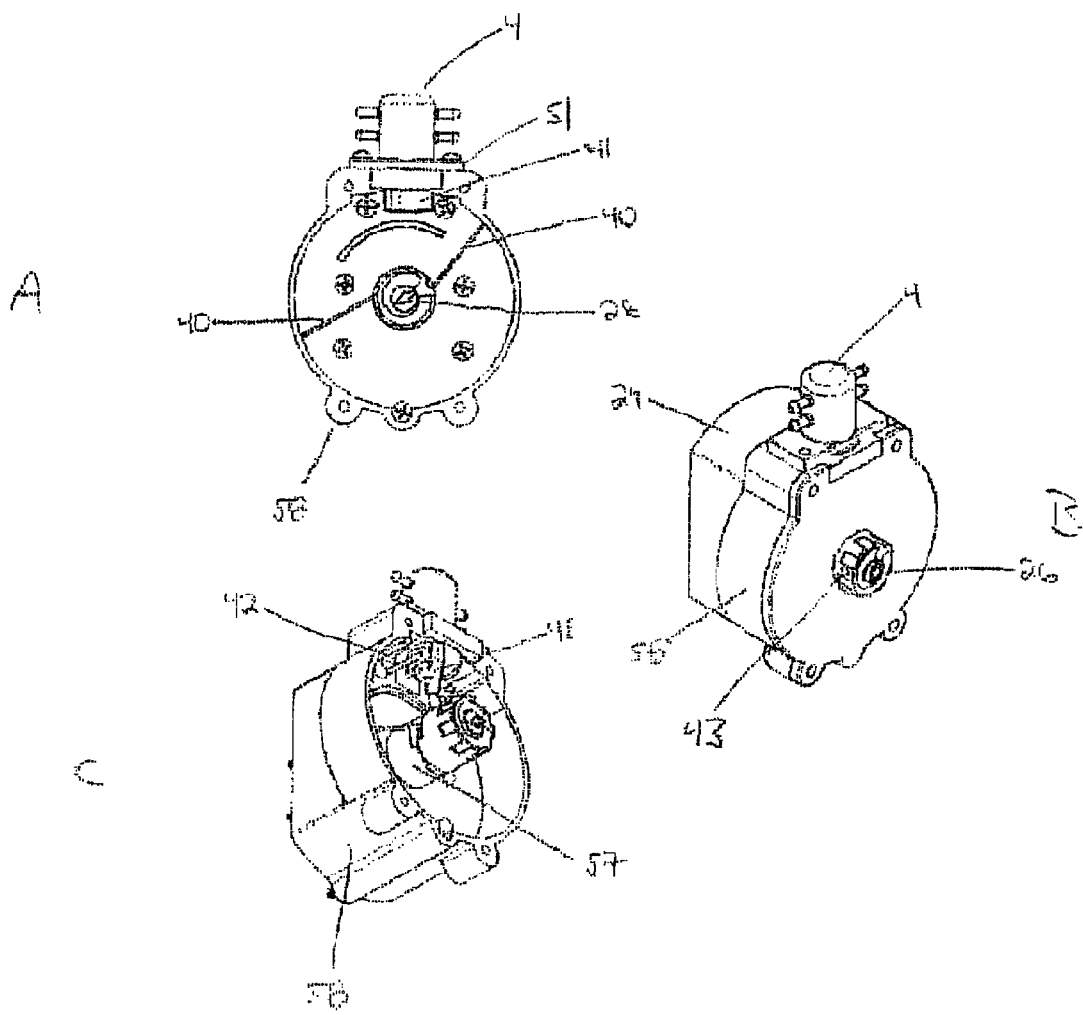
FIG. 7 depicts a timing control assembly in association with a servo valve.

FIG. 7 depicts a preferred embodiment of a timing control assembly 32. A timing control assembly is driven by a gearbox 24 and regulates switching between one or more output valves. A rotary force is transmitted from the gear box through the shank that is received by a gearbox socket. Thus, a drive shaft and spring arm mount 57 is rotated in response to fluid flow across the impeller. An actuator body 58 supports the drive shaft and spring arm mount 57 as well as the servo activation lever 41. The servo activation lever 41 is optionally maintained in position by a retainer clip 59 that also supports a central axis of the servo activation lever 41 such that forces applied to the lever 41 are translated to rotary motion. Movement of the servo activation lever 41 is driven by one or more spring arms 40 that translate the rotary force from the gear box to switch the servo activation lever 41. Preferably a timing mechanism has two spring arms 40. Each of two spring arms is oriented on the opposite side of a vertical axis upon which the servo activation lever 41 rotates. Thus, unidirectional rotation of the two spring arms 40 alternates the rotational direction of the servo activation lever 41. It is appreciated that multiple spring arms 41 are similarly operable. In a non-limiting example, four spring arms are operable to rotate the servo activation lever 41 at intervals smaller than that achieved by two spring arms. It is appreciated that other spring arm configurations are similarly operable.

A timing control knob 26 optionally allows adjustment of the position of the spring arm 40 relative to each other. Thus, the spring arms are illustratively at a 180 degree position relative to each other producing equal time for each position of the servo activation lever 41. Numerous other spring arm 40 configurations are operable that adjust the relative time for each position of the servo activation lever 41. Timing is adjustable to any desired ratio illustratively between the ranges of 20% to 80% for each position of the servo activation lever 41. Preferably, timing is adjustable in 10% increments ranging from 10% to 90% relative position of the servo activation lever 41. Small changes in the position of the timing control knob 26 can extend the timing to an even wider range. In a preferred embodiment the timing control knob has a set screw 43 that holds the timing in position between adjustments. It is appreciated that other means of maintaining position are operable illustratively including a spring loaded pressure lock, a friction fitting with or without position retaining stages, or other means of retaining rotary position known in the art. It is appreciated that other means of timing control are similarly operable. In a non-limiting example, replacement of the gears in the speed reducing mechanism 38 allows adjustment of the rate at which the drive shaft 57 rotates with each rotation of the impeller 29.

Preferably, the timing control knob has color-coded dials that indicate the percent of time that flow will discharge from the respective output ports. Preferably, each output valve is labeled by the color-coded buttons that depict settings of the timing control knob 26 so that a user can easily adjust the position of the timing control knob to the desired ratio of fluid delivery from each output port. Any color or numbering mechanism is operable for the timing control knob 26 and buttons illustratively including red, green, yellow, purple, black, white, orange, blue, or other suitable color known in the art. A numerical code is optionally employed to depict the time settings on the timing control knob. In a non-limiting example the number 8 translates to 80% of time fluid flows through that output port, 5 translates to 50%, and 2 translates to 20%. Each output valve is optionally labeled with a button of color that corresponds to one of two colors on the timing control knob 26. Each color on the timing control knob 26 is representative of a corresponding output port. Preferably, the color of the button on a particular output valve matches one on the timing control knob so that the user easily recognizes which setting represents which output valve. Thus, a user easily sets the relative time with confidence.

In a preferred embodiment the timing control knob 43 is also labeled with an arrow or other positional indicator to direct the user to the proper position to regulate flow as desired. Other markings illustratively include a line, dot, dash, or other operable label.

Figure 8:
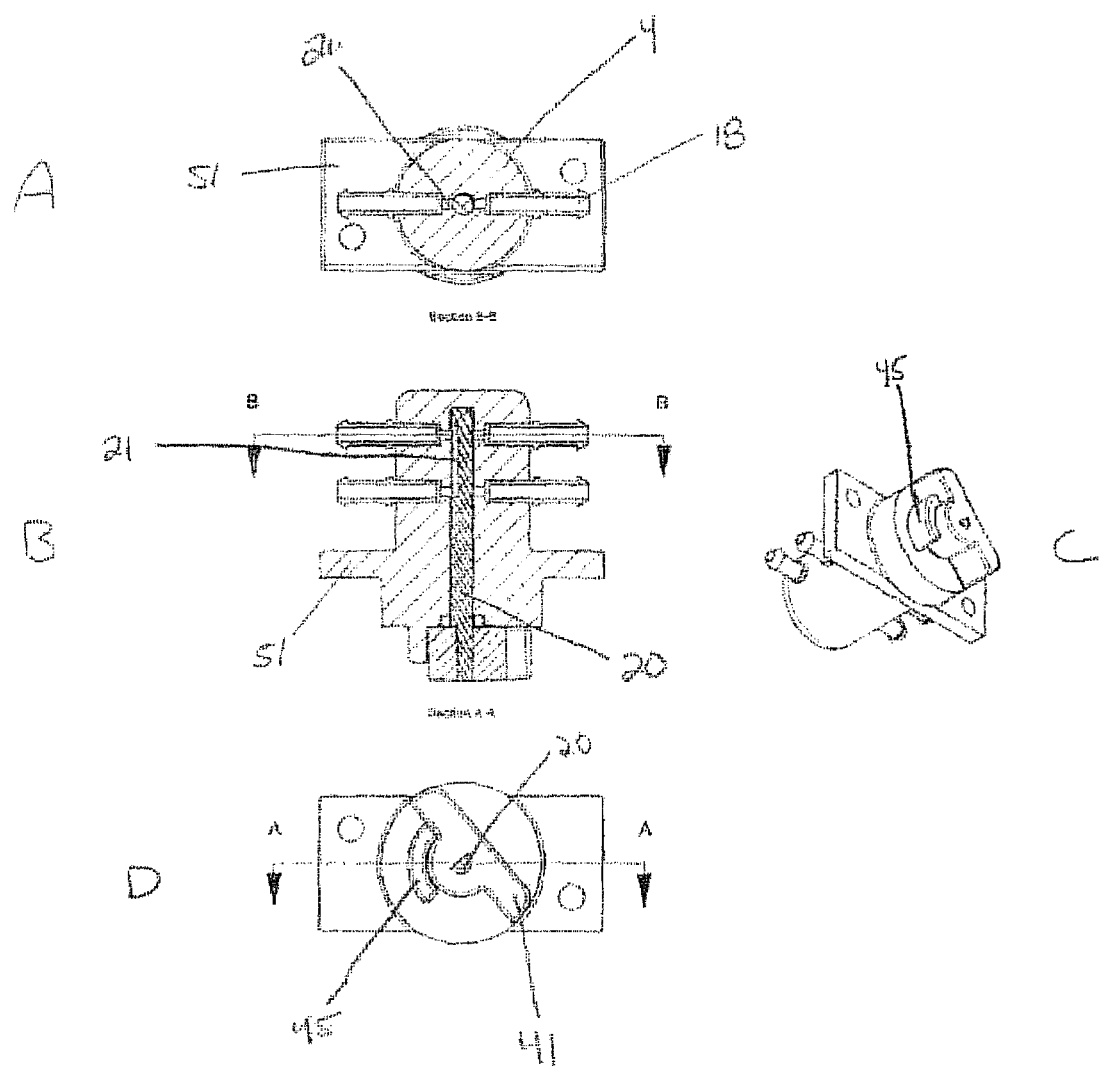
FIG. 8 depicts a servo valve as associated with a self-activating valve assembly.

Referring to FIG. 8, a preferred servo valve 4 is depicted as controlled by the position of the servo activation lever 41. The servo valve 4 is housed in a servo support block 51. The servo activation lever 41 is affixed to a servo valve shaft 20 that has one or more valve shaft ports 21. The orientation of the valve shaft ports 21 are aligned with the servo activation lever 41 such that each position of the lever correctly positions a valve shaft port 21 to allow fluid flow from one or more output valves. Preferably, a single valve shaft port aligns with two shafts connecting a single output valve. Preferably the valve shaft 20 is hemispherically shaped where it meets the servo activation lever 41 such that the rotational force in the lever is efficiently translated to the valve shaft 20. It is recognized in the art that other shapes for the servo activation lever interface end of the valve shaft 20 are similarly suitable illustratively including square, triangle, oval, rectangle, pentagon, hexagon, and other shapes known in the art. Alternatively or additionally, the valve shaft 20 meets the servo activation lever 41 in a pressure fitting such that the association of the two parts provides sufficient frictional force that rotation of the servo activation lever 41 translates to rotation of the valve shaft. It is also appreciated in the art that the servo activation lever 41 and valve shaft 20 are optionally formed from a single unitary piece eliminating the need for fitting a separate valve shaft 20 and servo activation lever 41.

In a preferred embodiment a servo activation lever 41 has one or more lever rotation stops 45 that prevent over rotation of the servo activation lever. FIG. 8D depicts a single lever rotation stop 45, however, it is appreciated that each servo activation lever preferably has two lever rotation stops such that the magnitude of servo activation lever rotation is controlled in each direction. The lever rotation stops 45 are optionally integral with the servo activation lever. It is appreciated that other mechanisms of regulating servo activation lever rotation are operable illustratively including a bar integral with or affixed to the servo support block or other support that extends to the servo activation lever preventing rotation beyond a desired point.

Referring to FIG. 7C, a detent bar 42 optionally extends from the servo support block 51, the actuator body 58, or other support. The detent bar 42 restricts rotational movement of a spring arm 40 at the distal end. Continuous rotation at the central axis of the drive shaft and spring arm mount 57 forces rotation of the proximal end of a spring arm forcing a bend in the spring arm. As rotation of the drive shaft and spring arm mount 57 continues the spring arm 40 slides along the detent bar until the end of the spring arm is reached releasing the energy stored in the bent spring arm, which quickly turns the servo activation lever 41. This rapid turning of the servo activation lever rapidly activates an output valve and deactivates another output valve, thus, preventing fluid hammering effects.

Optionally, movement of the servo activation lever 41 drives two valve shafts each extending from the control assembly to an output valve. Thus, the valve shaft port is optionally housed within the output valve and flow between the diaphragm port and the exit port is directly controlled in the absence of a servo valve.

In a preferred embodiment, one or more protective shrouds are present between the spring aims 40 such that each spring arm interacts with only one side of the servo activation lever. A spring arm guide bushing is optionally placed on each spring arm that separates the spring arm from the protective shroud. In a preferred embodiment two protective shrouds are employed with one on each side of an actuator body support block. The thickness of the actuator body support block is sufficient to direct each spring arm to an extension on the servo activation lever. Each spring arm is separated from the other by the protective shrouds and drives rotation of the servo activation lever in one direction. Thus, a single rotary direction of both spring arms will alternate the rotational direction of the servo activation lever producing a switching fluid flow between one or more output valves. An angular offset as determined by the timing adjustment knob 26 sets the ratio of time each output valve is activated.

Referring to FIGS. 1 and 4, one or more output valves are associated with a self-actuating valve assembly 27. In a preferred embodiment a single control assembly 23 controls flow between two output valves. It is appreciated that a single output valve is optionally regulated by the assembly or that 3, 4, 5, 6, 7, 8, 9, or 10 valves are optionally regulated. The output valves 7 are illustratively concentrically oriented around the control assembly 23. However, when two output valves 7 are controlled by the control assembly 23 an offset linear relationship is optionally employed. It is appreciated that a linear or direct connection relationship between the control assembly 23 and the output valves 7 is operative herein.

A commercially available sprinkler valve is operative as an output valve with little or no modification. In a preferred embodiment an output valve is optionally modified to direct fluid flow between the output valve and the control assembly. More preferably an output valve is unmodified and an adapter is used to direct fluid flow to and from the control assembly.

Illustratively, a commercially available sprinkler valve is employed as an output valve with few modifications. The solenoid is removed exposing the solenoid mount which is threaded and houses two ports. A first port leads to a diaphragm cavity and is a diaphragm port, and a second port is an exit port that leads to the output port 2. The solenoid mount and the openings of the diaphragm and exit ports are optionally plugged. Any material suitable for plugging is operable herein illustratively including thermoformable plastic, polyurethane, polypropylene, polyethylene, polyester, vinyl, polystyrene, rubber, aluminum, steel, other suitable metals, reinforced plastic, inter fiber reinforced composite, cork, combinations thereof, or other materials known in the art. Preferably, an epoxy or polyester resin is used to plug the solenoid mount. Each output valve has a cap and a body. The cap houses the solenoid mount and has two openings whereby the diaphragm port and exit port pass. As the solenoid mount ends of the ports are plugged, a new hole is created to provide access from the diaphragm cavity to the original exit port. The output valve body of a commercial valve has a port that fits the original exit port of the cap providing access to the output port. A plug is optionally inserted in the exit port at its distal end. A hole is created in the side of the output valve body accesses the original exit port such that assembly of the valve body and the cap creates a port accessible from the outside of the body that leads to the diaphragm cavity. This converts the original exit port into diaphragm port. A new exit port is created by creating a port between the outside of the valve body and the output port. A tubing interconnect fitting is optionally mounted on the new exit port and the new diaphragm port such that these ports are capable of fluid communication with the control assembly 23. It is appreciated that modifications preferably do not hinder access to the diaphragm for servicing or replacement.

More preferably, an unmodified output valve is employed. Proper routing of fluid between the output valve 7 and the control assembly 23 is achieved with an adapter that replaces the solenoid of a commercially available valve.

Figure 9:
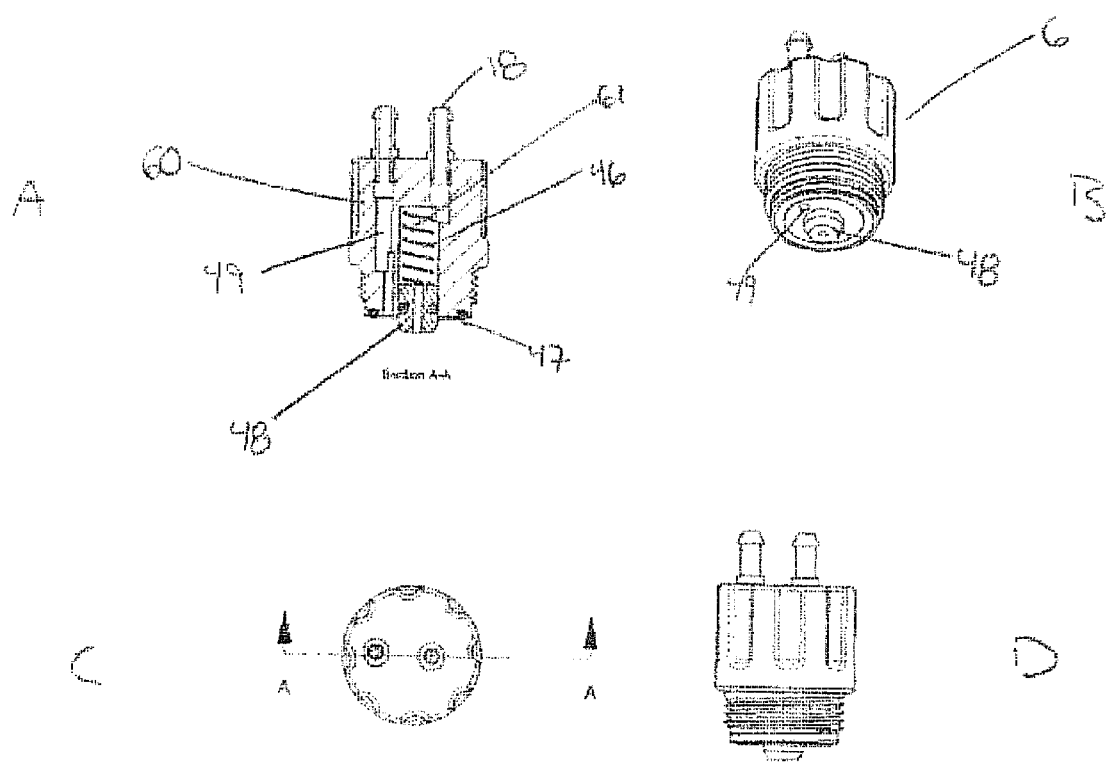
FIG. 9 depicts an adapter.

It is appreciated that the directional ports are produced de novo with construction of an output valve and no modification is necessary. FIG. 9 depicts an exemplary adapter (6 in FIGS. 1 and 4). An illustrative adapter has a threaded body with two ports. A first port 49 provides access from the outside of the adapter to the diaphragm port in the output valve. The adapter body 60 also has a bore 61 that is connected to a second port providing access from the outside of the adapter to the exit port in the output valve. The bore 61 houses a spring 46 and an inner seat 48. The inner seat 48 slides relative to the adapter body and is forced outward by the spring 46. A seal is optionally achieved between the inner seat 48 and the bore 61 by an O-ring, or other sealing mechanism known in the art. A small flange is optionally present in the bore to retain the inner seat 48 when the adapter is removed from the solenoid mount in the output valve. Preferably, the inner seat has a shaft that allows fluidic connection between the second port and the exit port in the output valve. A second O-ring 47 is optionally present at the bottom of the threaded end of the adapter body 60 to prevent fluid leakage outside the adapter when inserted into the solenoid mount on the output valve. An adaptor seats in the location where the solenoid is commercially mounted in the output valve and is connected to the servo valve (4 in FIGS. 1 and 4) using small control tubes. The flow path through the servo valve is such that output valve switching is accomplished when the respective servo body shafts are opened by connection with a valve shaft port. Therefore, an unmodified commercial diaphragm valve is operative in remote locations without the need for electric control power at the remote site. Adaptors can be provided to physically mate any brand of commercial valve.

When the adaptor 6 seats into the solenoid receptacle of an output valve, the outer O-ring seals it to the output valve cap providing access to the diaphragm port and simultaneously the center face seats over the exit port. Production accuracies of the particular output valve parts used for demonstration models allow the simultaneous mating of both surfaces.

It is appreciated that an adapter 6 is optionally manufactured without an inner seat 48 or seat spring 46. In this embodiment an optional protrusion is present below the adapter bore that is manufactured to fit snugly against the exit port in the output valve 7 when the adapter is seated in the solenoid mount of a commercial output valve. An additional O-ring is preferably employed to prevent fluid leakage from the adapter into the diaphragm cavity or exit port. Thus, fewer moving parts are necessary improving performance and reducing maintenance.

The control assembly 23 and the output valves 7 are optionally arranged in numerous configurations. In a non-limiting example, the control assembly 23 is arranged prior to a junction dividing flow between two output valves 7 as is illustrated in FIG. 1. Alternatively, the control assembly 23 is positioned between two or more output valves 7 as depicted in FIG. 4. When the control assembly is a self-activating valve assembly, the impeller is optionally in direct line with the drive shaft and spring arm mount 57, or arranged perpendicular thereto. Optionally, a right angle gear is used to translate rotational force between the impeller and the gear box. Alternatively, a right angle gear is employed between the gears of the speed reducing mechanism 38 and the drive shaft 57. Any right angle gear mechanism known in the art is operable herein. Illustratively, a worm gear is employed as the drive pinion 37. A worm gear has the advantage of translating rotational force in one direction. Alternatively, one or more helical gears are employed to configure the arrangement of the control assembly 23 relative to the output valves and the fluid inlet port 1 to any desired angle. Other gear types are operable in the speed reducing mechanism and in the interface between the impeller and the speed reducing mechanism illustratively including, but not limited to, face gear, hypoid gear, bevel gear, screw gear, planetary gears, combinations thereof, or other gear types known in the art.

A PA is illustratively used in a fluid delivery system where extra unused stations are available on the existing system watering timer. PA illustratively switches between two output valves 7 using the pressure increase of the fluid source when turn-on occurs. This activates a servo valve 4 which opens one of the output valves and closes the other. When the fluid source is turned off, the servo valve 4 remains in its last used position to keep open a path for pressure relief so that the activator diaphragm 12 can reset to the initial state. When the fluid source is turned on again the pressure increase activates the servo valve 4 to open the closed output valve and close the other. This alternating opening and closing allows one input source to serve two fluid delivery areas with equal flow and pressure. Time of use of each fluid delivery area is established at the source by the control timer. It is appreciated that by adding more ports to the servo valve shaft 20, more output valves are optionally controlled using the same concepts described above for two output valves.

It is appreciated that one or more bladder membranes are operable as a pressure activating device. In this embodiment, timing control devices are present to control filling each bladder thereby controlling output flow time. A blade is optionally placed between each bladder such that filling of one bladder moves the blade in a direction activating one output valve and deactivating another.

The existing source is optionally turned on and off by two or more fluid delivery station terminals. Most timers will operate by connecting the desired terminals to the source control valve using jumper wires between terminals. Many timers have a time delay between stations that will afford time for the servo valve to reset. However, if the time is inadequate for reset, another fluid delivery station is optionally operated between the two PA times to allow time for reset. Additionally, some timers have a second program capability, and that program can also be used to control the source valve for turn on at another time thereby eliminating the need for jumper wires. In either case, time for fluid delivery is set as desired for each station.

Operation of a self-actuating valve assembly as depicted as the control assembly 23 in FIG. 4 occurs generally by fluid entry at the fluid inlet port 1, passing through a turbine assembly, and then exit via either output port. The turbine 25 generates rotary power that drives, via a speed reducing gearbox, a servo valve 20 which opens an associated output valve. The relative time of fluid flow from either output ports is adjustable. Increasing the on-time for the original line makes it possible for the fluid delivery area to be increased accordingly since each output port provides the same flow rate and pressure as the original line. This allows each new line to cover an area equivalent to that covered by the original line.

A turbine is generally operated as fluid passes over the stator 30 and is directed into a swirl which impacts the impeller 29 at an angle causing it to rotate. The impeller's rotor blades 35 are optionally curved so that the axial flow creates additional torsion force assuring adequate torque and rotational velocity to power the servo valve 4. The turbine output shaft 34 optionally provides this power to the gearbox 94 through a low friction bearing. Turbine pressure losses are kept negligible by maintaining a flow cross section area that is larger than that of the input and output lines and by providing smooth streamlined changes in internal passage shapes. Losses due to turbine torque and friction are insignificant as well. Therefore, pressure at the output port is similar to pressure at the inlet port.

The turbine shaft 34 enters the gearbox 24 through a low friction bushing in the turbine housing. A gear is attached to, or integral with, the shaft which drives the cluster gears that reduce rotational velocity and amplify torque at the gear output shaft 62. Gears are optionally molded plastic and rotate on corrosion resistant spindle shafts. The housing is of corrosion-free plastic and the entire unit is optionally sealed. The output shaft 62 is optionally sealed with an O-ring to ensure no fluid leaks from the gearbox 24. This arrangement allows the turbine shaft bushing to have relatively large clearances and resultant low friction. Since there is ample torque at the gearbox output shaft 62, it easily overcomes the friction of the waterproofing O-ring. The low friction turbine bearings prevent any chance of static friction hang-up at operational start and ensure reliable turbine performance. An optional small bleed hole into the main flow path allows drainage so as to prevent freeze damage to the gearbox. The shank on the output shaft mates the servo valve 4 or timing control assembly 32.

The output shaft 62 nests into the shape matching socket of the drive shaft 57 and rotates the servo actuator spring arms 40. These spring arms 40 in turn rotate the servo activation lever 41 to activate the output valves 7. When the spring arms 40 approach the servo activation lever 41, they encounter the detent bar 42 that restrains them until sufficient force is stored in the spring 40 to quickly rotate (snap action) the servo activation lever 41. The spring arm 40 is released when the resulting radius of the bending spring arm is reduced enough to allow it to pass the detent bar. The servo valve 4 is optionally a bypass arrangement that directs a small volume of fluid through the tubes 5 to activate the internal diaphragms of either output valve. The quick snap action of the servo valve prevents water hammer pounding oscillations of output valve diaphragms that occur if the action is too slow, The servo valve 4 cannot hang-up because the valve shaft 20 and body 17 have low friction clearances. These clearances do not affect performance since small internal leakages are not large enough to trigger activation of the output valves.

Output valve timing adjustment is achieved by angularly repositioning two spring arms 40 relative to each other. This is optionally done by loosening the set screw 43 and rotating the timing control knob 26. Dials on the knob 26 indicate the relative time fluid will flow through each output port 2. Thus, the user can select fluid delivery times to each output port 2 according to his needs.

It is appreciated that elements of the instant invention are capable of independent manufacture either in themselves or as single element combinations to minimize the number of elements necessary. In a non-limiting example, the turbine housing and gearbox assembly can be made to have all parts installed from the gearbox side, or control passages or tubes 5 can be made integral to the housings to eliminate material and labor costs associated with external tubing as is depicted in FIG. 59a of U.S. Provisional Application No. 60/901,055.

The present invention is further illustrated with respect to the following non-limiting examples.

EXAMPLE 1

Figure 10:
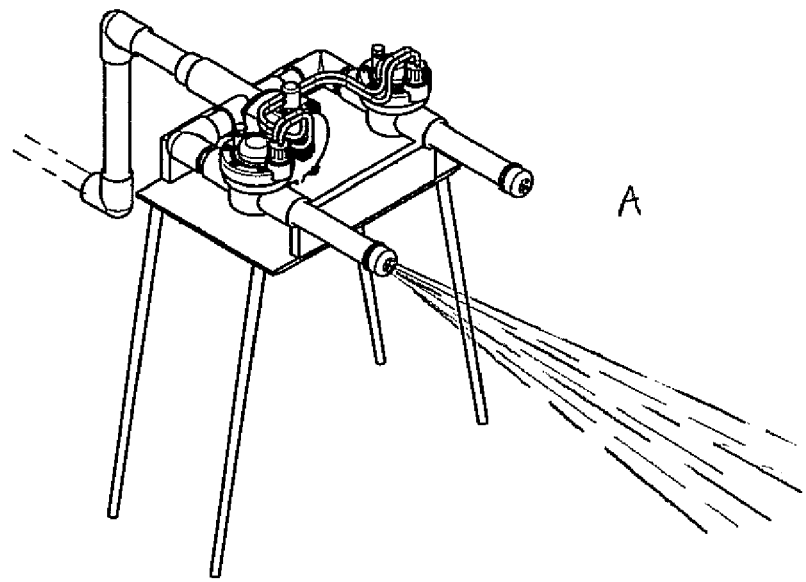
FIG. 10 depicts a flow control device controlling water flow between two output ports.
Figure 10:
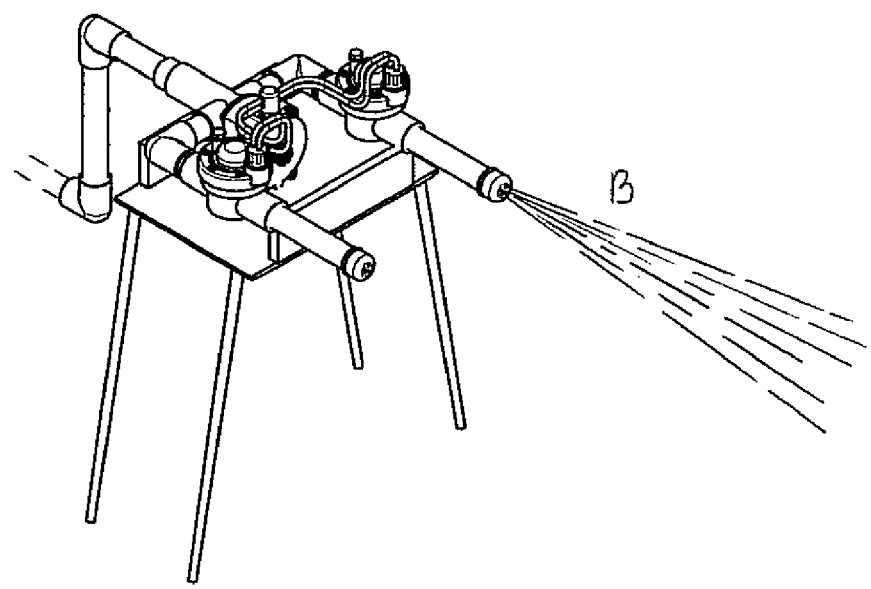

Operation: Referring to FIG. 10, a fluid activated servo assembly equipped with a self-activating servo assembly has been tested and performs the desired tasks reliably and efficiently. The figures demonstrate the device operating with water exiting through either output port and spraying out of nozzles that simulate normal sprinkler head pressure losses. One full cycle of watering through both ports is approximately 10 minutes.

References cited or otherwise present herein are indicative of the level of skill in the art to which the invention pertains. These references are hereby incorporated by reference to the same extent as if each individual reference was explicitly and individually incorporated herein.

I claim:

1. A fluid flow control device comprising:
    a pressure activated servo assembly comprising a diaphragm;
    a drive post fixedly connected to said diaphragm;
    a cog wheel rotated by said drive post transferring movement of said diaphragm;
    a valve shaft fixedly connected to said cog wheel, said valve shaft having at least one valve shaft port;
    a plurality of tubes in selective fluid communication through said at least one valve shaft port; and
    at least one output valve having a diaphragm cavity located upstream of said at least one valve shaft port and connected to two of said plurality of tubes such that fluid flow from said diaphragm cavity through said at least one valve shaft port activates said output valve.

2. The flow control device of claim 1 wherein said at least one output valve is two output valves.

3. The flow control device of claim 1 wherein said at least one output valve has a solenoid mount and further comprises an adapter inserted into said solenoid mount, said adapter having a body and a first port and a second port;
    wherein said first port is fixedly connected to one of said plurality of tubes such that fluid is transportable between said first port and said one of said plurality of tubes;
    said first port in fluid communication with a diaphragm port in said at least one output valve;
    said second port is connected to one of said plurality of tubes such that fluid is transportable between said second port and said one of said plurality of tubes;
    said second port in fluid communication with an exit port in said at least one output valve.

4. The flow control device of claim 3 wherein said adapter further comprises a bore in alignment with said exit port;
    said bore integral to said second port;
    an inner seat in slideable connection with said bore;
    a spring abutting said body and said inner seat, said spring capable of placing said inner seat in connection with said exit port.

5. The flow control device of claim 1 wherein said drive post is comprised of a post and a cog drive spring, said cog drive spring serving to interact said drive post with said cog wheel.

6. The flow control device of claim 1 further comprising an anti-back rotation leaf spring stop, said stop abutting said cog wheel such that rotation of said cog wheel is unidirectional.

* * * * *